Figure 1:
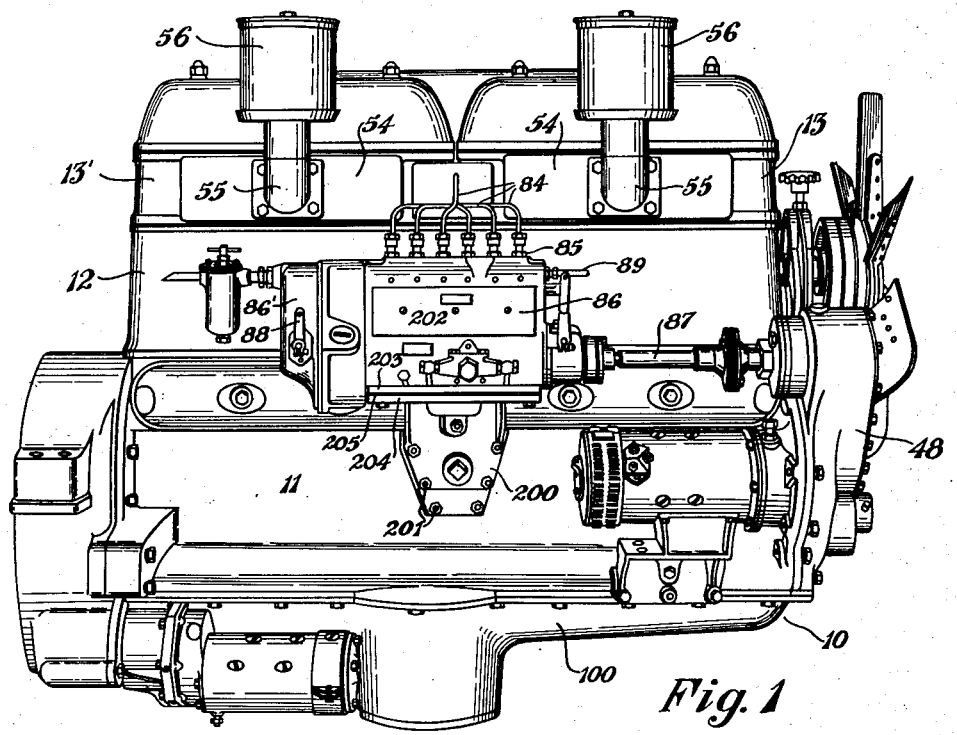

May 5, 1936. O. D. TREIBER 2,039,942
INTERNAL COMBUSTION ENGINE AND FUEL PUMP APPARATUS THEREFOR
Filed Oct. 17, 1933 3 Sheets-Sheet 1

Inventor
O. D. Treiber
By Fraser and Bishop
Attorneys

May 5, 1936.  O. D. TREIBER  2,039,942

INTERNAL COMBUSTION ENGINE AND FUEL PUMP APPARATUS THEREFOR

Filed Oct. 17, 1933   3 Sheets-Sheet 3

Inventor
O. D. Treiber
By Freare and Bishop
Attorneys

Patented May 5, 1936

2,039,942

UNITED STATES PATENT OFFICE

2,039,942

INTERNAL COMBUSTION ENGINE AND FUEL PUMP APPARATUS THEREFOR

Otis D. Treiber, Canton, Ohio, assignor to Hercules Motors Corporation, Canton, Ohio, a corporation of Ohio Application October 17, 1933, Serial No. 693,939

10 Claims. (Cl. 123—196)

The invention relates in general to internal combustion engines preferably of the compression ignition type, and in which preferably liquid hydrocarbon fuel is injected into the combustion chambers of the engine; and more particularly the invention relates to such an engine as set forth in my prior application for United States Letters Patent for Compression ignition internal combustion engines, filed February 3, 1933, Serial No. 655,079, which has issued on May 22, 1934, as U. S. Patent No. 1,960,093, now U. S. Reissue Patent No. 19,742.

In the operation of compression ignition internal combustion engines, which may be termed compression ignition injection engines, it is desired to burn the liquid fuel at a time in relation to the position of the piston of each cylinder and at a rate or velocity of burning so as to create a rise in pressure in the burning fuel charge contained in the combustion chamber or chambers formed in part by each piston, so that as each piston passes over top dead center from the compression stroke into the power stroke, the velocity or rate of increase of the rising pressure in the burning fuel charge is such as to produce a desired maximum pressure and such as to maintain this maximum pressure substantially constant during the power stroke of the piston until combustion of the fuel charge is complete.

In the creation of this desired pressure rise in the burning charge it is necessary that the preferably atomized particles of the liquid hydrocarbon fuel be intimately contacted and mixed with the molecules of oxygen of the air introduced into the combustion chamber or chambers so that the uniting or combustion of the particles of fuel and the molecules of oxygen is effected at such rate so as to develop and maintain the desired pressure rise in the burning fuel charges as aforesaid.

In any particular compression ignition injection engine, the attainment of the desired character of fuel combustion as aforesaid, for any given speed of rotation of the crank shaft of the engine is evidenced by a relatively high mean indicated pressure in the combustion chambers of the engine.

On the other hand it is very desirable, particularly in the case of industrial and automotive engines, that the speed of rotation of the crank shaft be as high as possible, so as to obtain maximum power with minimum weight of engine.

As the number of crank shaft revolutions per unit of time increases, the time interval in which it is possible to mix, and unite or burn each fuel and air charge as aforesaid, becomes less in direct inverse ratio to the increase in the number of crank shaft revolutions per unit of time.

Consequently the usual dynamic and pressure conditions found suitable in the mixing and combustion chambers of relatively low speed compression ignition injection engines for a proper rate of mixing and uniting or burning of the hydrocarbon particles and the oxygen molecules is not adequate to effect proper mixing and uniting or burning as the crank shaft revolutions increase per unit of time.

The foregoing difficulties incident to the construction and operation of compression ignition injection engines is furthermore evidenced by the fact that prior to the production and operation of the first engine including among others the present improvements and the improvements of my said U. S. Patent No. 1,960,093, now U. S. Reissue Patent No. 19,742, the maximum generally known speed of rotation of the crank shaft of such an engine was only 1800 R. P. M. with a mean indicated pressure, or in other words, a mean effective pressure of 100 to 110 pounds per square inch in the combustion chambers.

In my said U. S. Patent No. 1,960,093, now U. S. Reissue Patent No. 19,742, there is set forth an engine including among others the present improvements in part, and in which the preferably liquid hydrocarbon fuel is injected into the combustion chambers of the engine, and which is capable of operation at relatively high speeds of rotation of the crank shaft of the engine, which may be for example 2000 to 3000 R. P. M., and with a relatively high mean indicated pressure in the combustion chambers of the engine, which may be for example a mean indicated pressure of as high as 160 pounds per square inch at 2000 R. P. M.

In the compression ignition internal combustion engine of said prior application and of the present application, the mixing and combustion chambers are so formed and arranged as to permit proper mixing and combustion of the injected fuel at high speeds of rotation of the crank shaft of the engine.

The valve apparatus for such an engine must be mechanically suitable for the relatively high speed operation and must be adequately lubricated, and the valve apparatus of the engine of my said U. S. Patent No. 1,960,093, now U. S. Reissue Patent No. 19,742, and of the present application, include the preferred and novel valve apparatus set forth in detail and claimed in my application for U. S. Letters Patent for Internal combustion engines and valve apparatus therefor, filed July 1, 1933, Serial No. 678,689.

The cooling apparatus for such an engine must be such as to enable the operation of the engine at relatively high speeds and relatively high compression and power output, without overheating, and the cooling apparatus of the engine of my said U. S. Patent No. 1,960,093, now U. S. Reissue Patent No. 19,742, and of the present application, include the preferred and novel cooling apparatus set forth in detail and claimed in my application for U S. Letters Patent for Internal combustion engines and cooling apparatus therefor, filed July 6, 1933, Serial No. 679,175.

The engine set forth in my said U. S. Patent No. 1,960,093, now U. S. Reissue Patent No. 19,742, in my said prior application, Serial No. 678,689, in my said prior application, Serial No. 679,175, and also as set forth herein, in conjunction with the present improvements; constitutes a "valve-in-head" engine including among other parts, a cylinder block, a cylinder head, and a crank case.

Constant volume mixing and combustion chambers are provided in the cylinder block and are located as closely as possible to, and communicatingly connect with, varying volume chambers formed by the cylinder bores, the cylinder heads, and the pistons operatively mounted in the cylinder bores.

The fuel apparatus for such an engine must be adapted for injecting a charge of the preferably liquid hydrocarbon fuel into each constant volume chamber, preferably during the compression stroke of the associated piston, and for this purpose the fuel injecting means of the engine includes for each constant volume chamber, a pintle nozzle. Each pintle nozzle is mounted in the cylinder block, and the discharge end of each nozzle extends into and terminates in the constant volume chamber with which the particular nozzle is associated; and each nozzle is communicatingly connected by a fuel delivery tube with one of the discharge outlets of a fuel supply and distributing pump, which is operatively mounted at one side of the engine crank case.

The pump includes timed means injecting a charge of fuel during the proper interval through each of the fuel delivery tubes and the nozzle served thereby into the particular constant volume chamber with which the particular nozzle is associated.

The pump may be of usual construction and arrangement, such as a Bosch fuel injection pump, made by Robert Bosch A.-G., Stuttgart, Germany, such as described in the Baur and Lempp U. S. Patent No. 1,928,476, dated September 26, 1933, and includes governing means which may be self-contained within the pump casing, and which are controlled by a control arm which is in effect the throttle for the engine, and the pump is connected by a main fuel supply tube with a source of the desired liquid fuel.

Such a fuel injection pump includes plunger pistons, one for each nozzle, and each actuated by a cam, the cams being provided on a cam shaft journalled in the pump casing.

The parts of such pumps are made with a very high degree of precision, in order to attain the desired high speed operation of the same, and it is absolutely essential that the pump parts be provided with adequate lubricant, particularly the pump cam shaft and the cam follower ends of the plungers.

Proper lubrication of the fuel pump of a compression ignition internal combustion engine is one of the most essential requirements of such an engine, because any improper functioning or breaking down of the fuel pump will cause an improper functioning or stopping of the engine, since the fuel charges will not be supplied to the constant volume chambers of the engine, when the fuel pump is functioning in an improper manner, or has stopped.

From another standpoint, it is essential that the fuel pump be operatively mounted on the engine in such manner as to maintain at a minimum the over-all dimensions of the engine, and also in such manner to reduce to a minimum exposed fittings and connections therefor.

The objects of the present improvements include in general the provision of a preferably compression ignition internal combustion engine, the engine being adapted for relatively high speed and relatively high compression operation, and preferably including the improvements relating to combustion chambers particularly set forth and claimed in my said U. S. Patent No. 1,960,093, now U. S. Reissue Patent No. 19,742, and also preferably including the improvements in valve apparatus particularly set forth and claimed in my said prior application, Serial No. 678,689, and also preferably including the improvements in cooling apparatus particularly set forth and claimed in my said prior application, Serial No. 679,175, and also, in connection with the cam shaft bearings and drive connection for the lubricating pump of the engine, preferably including the improvements in shaft gearing and bearings particularly set forth and claimed in the application for U. S. Letters Patent of Guy E. Hinkle, Serial No. 689,865, filed September 18, 1933, and the engine including a fuel injection pump and novel and improved means for providing adequate lubrication for the fuel pump.

Further objects of the present improvements include the provision of a combined supporting, closure, and lubricant passageway and chamber forming bracket, which is secured to the crank case of the engine, and which supports the fuel injection pump, and which in combination with crank case chambers and parts and with chambers and parts of the fuel injection pump, provide means and apparatus for properly lubricating the fuel injection pump.

Further objects of the present improvements include the provision of means for providing adequate lubrication for the fuel injection pump of such an engine, preferably including a combined supporting, closure, and passageway and chamber forming bracket, as aforesaid, and the structure of which is of such form and arrangement as to maintain at a minimum the over-all dimensions of the engine as a whole, and also of such form and arrangement as to reduce to a minimum exposed fittings and connections therefor.

Further objects of the present improvements include the provision of improved details of construction and/or arrangement for certain of the parts of the engine, the fuel injection pump, and the lubricating means and apparatus for the fuel injection pump, as hereinafter set forth.

The foregoing and other objects are attained by the improvements, apparatus, parts, combinations, and sub-combinations, which comprise the present invention, and the nature of which is set forth in the following general statement, and preferred embodiments of which together with their mode of use are set forth in the following description, and which are particularly and distinctly pointed out and set forth in the appended claims forming part hereof.

The nature of the improvements of the present invention may be described in general terms as including in a compression ignition internal combustion engine in combination with other usual or improved parts, a cylinder block, a cylinder head, and a crank case, the cylinder block being provided with constant volume mixing and combustion chambers which are located as closely as possible to and communicatingly connect with varying volume chambers formed by the cylinder bores, the cylinder heads, and the pistons of the engine.

A fuel injection pump is operatively associated with the constant volume chambers for injecting fuel charges into the constant volume chambers at the proper times.

The crank case preferably includes a reservoir chamber, and lubricating pump means are operatively mounted preferably in the crank case of the engine and are arranged to supply lubricant under pressure to the crank case reservoir chamber.

The fuel injection pump of the engine includes among other parts, a casing and a cam shaft which is operatively mounted in a cam shaft chamber of the casing, the fuel pump cam shaft having formed thereon a plurality of cams each of which actuates one of a plurality of plunger pistons of the pump.

According to the present improvements, walls form lubricant delivery passageways communicating between the crank case reservoir chamber and the cam shaft chamber of the fuel pump, separate lubricant discharge passageways communicating between the fuel pump cam shaft chamber and the interior of the engine crank case, and preferably U passageway means are operatively interposed between the delivery passageways and the discharge passageways, whereby lubricant is maintained at a predetermined level in the fuel pump cam shaft chamber.

Also according to the present improvements, the fuel pump is supported on the engine by a combined supporting, closure, and passageway and chamber forming bracket which forms in part and has self-contained therein certain passageways, chambers, and parts of the improved means and apparatus for lubricating the fuel injection pump.

The engine preferably includes further novel improvements illustrated in the drawings and/or as hereinafter set forth.

Figure 2:
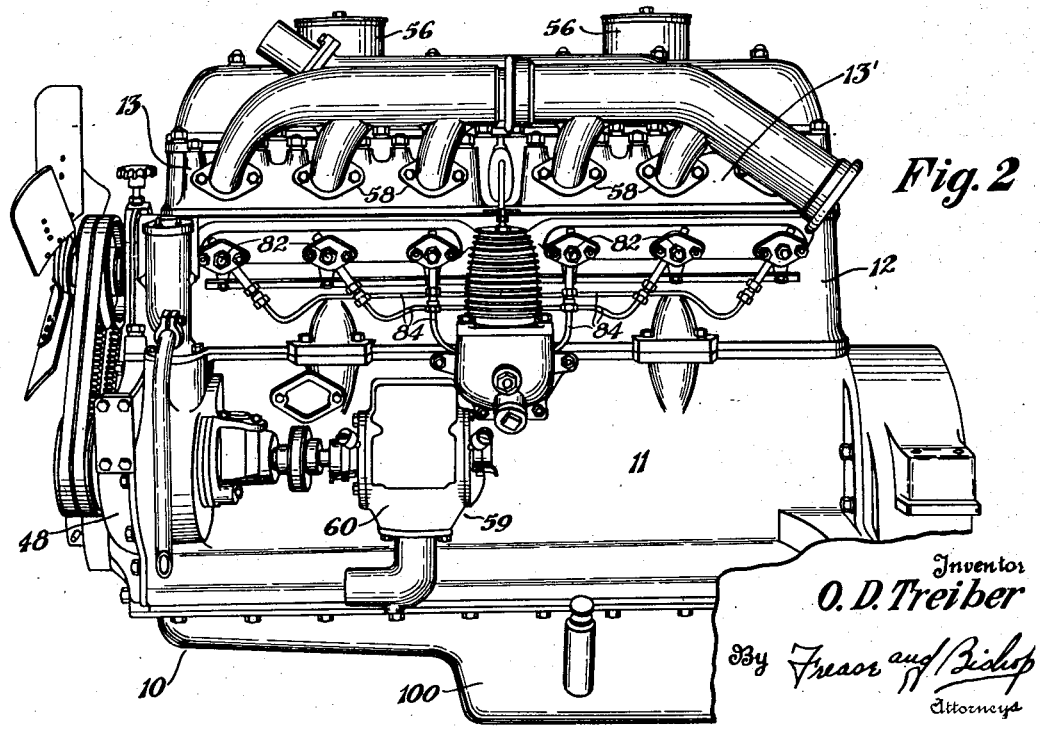
Figure 3:
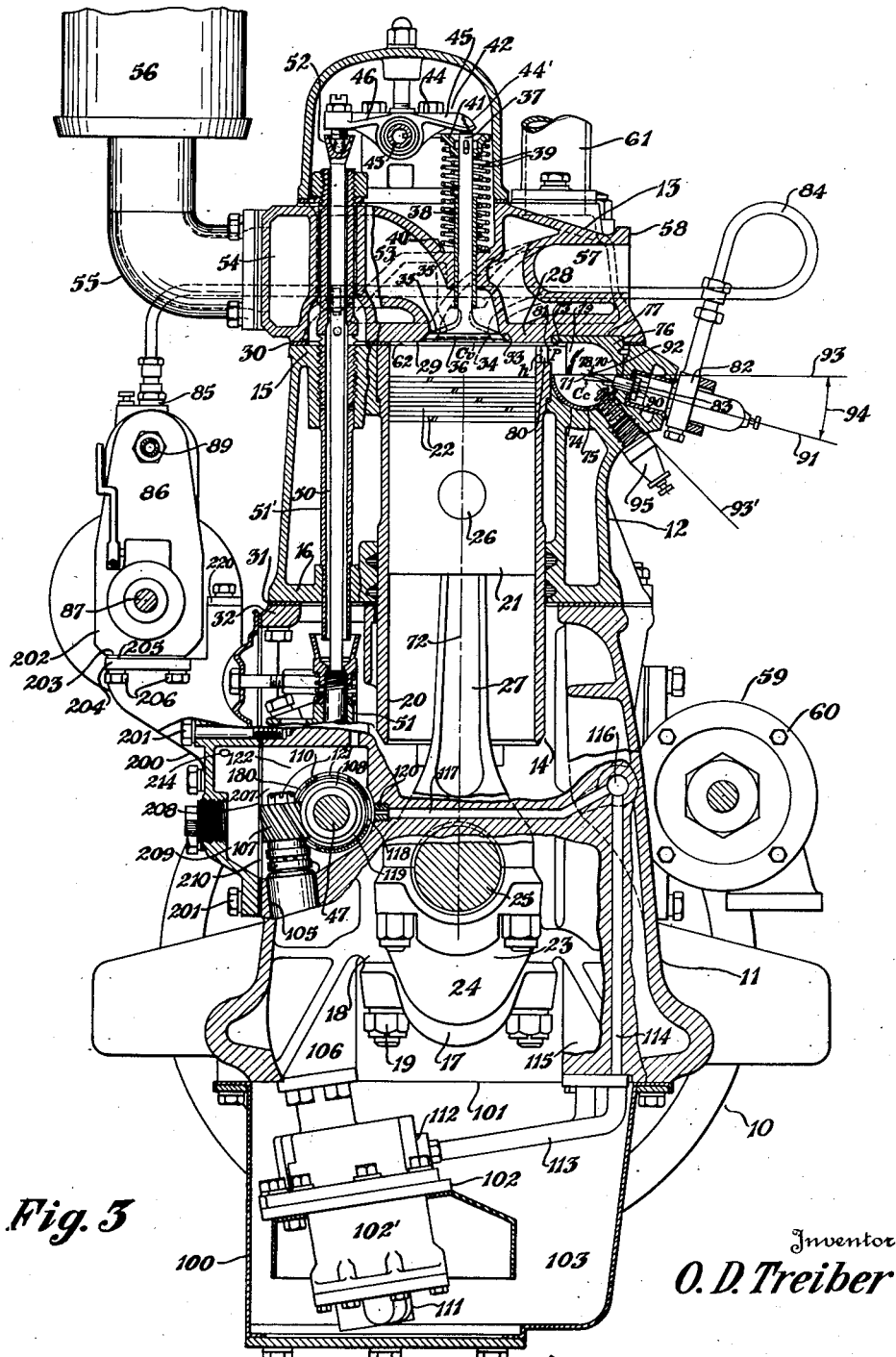
Figure 4:
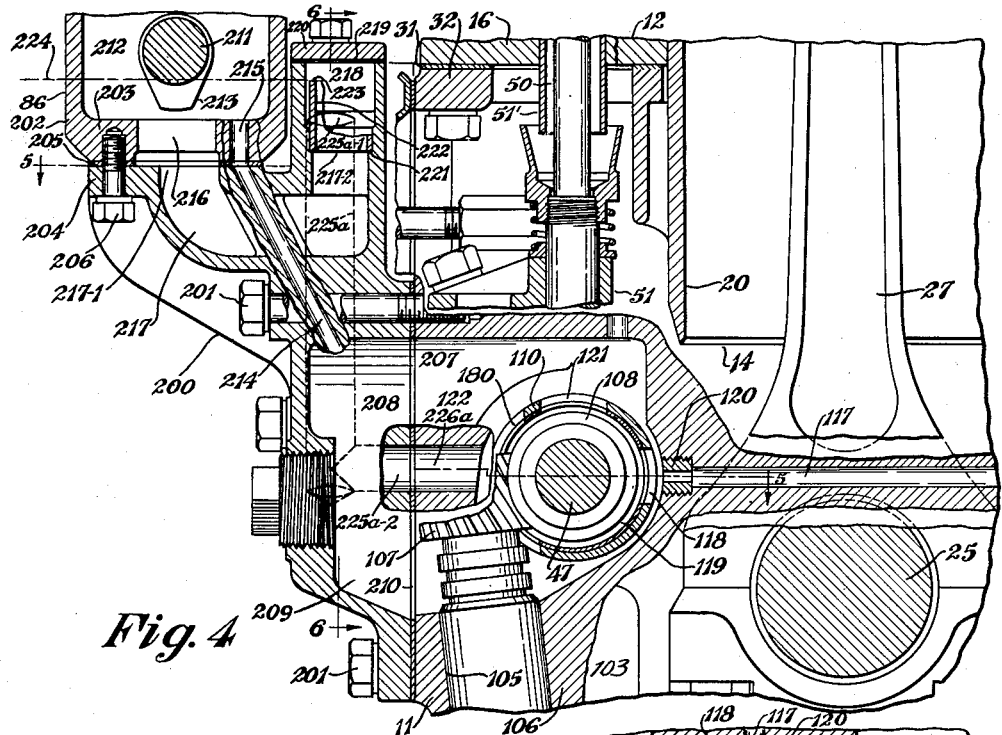
Figures 5, 6:
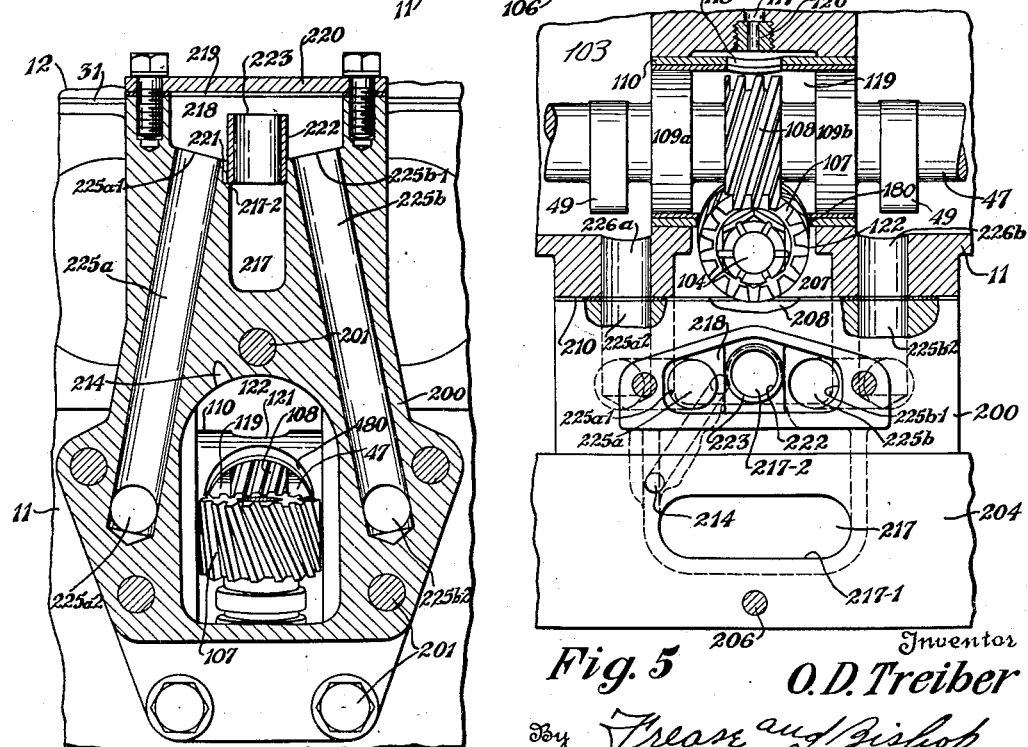

A compression ignition internal combustion engine embodying among others the present improvements is illustrated in the accompanying drawings forming part hereof, in which Figure 1 is an elevation view of the side of the improved engine at which the fuel pump is located;

Fig. 2, a fragmentary elevation view of the other side thereof;

Fig. 3, an enlarged transverse sectional view thereof, with portions broken away, and illustrating one of the cylinders of the engine and its piston and the combustion chambers associated therewith, and also illustrating partly in vertical section and partly in elevation the associated and improved bracket forming a part of the present improvements;

Fig. 4, a still further enlarged fragmentary view of portions of Fig. 3, with portions broken away and illustrated partly in vertical section and partly in elevation for more clearly showing the present improvements;

Fig. 5, a fragmentary horizontal sectional view thereof as on line 5—5, Fig. 4; and Fig. 6, a fragmentary vertical sectional view thereof as on line 6—6, Fig. 4.

Similar numerals refer to similar parts throughout the drawings.

The compression ignition internal combustion engine embodying among others the present improvements is indicated generally at 10, and as illustrated is a six cylinder, four stroke cycle, single action, high speed, compression ignition internal combustion engine, in which the air for combustion is obtained normally directly from the atmosphere, and in which separate quantities or charges of the preferred liquid hydrocarbon fuel, such as Diesel oil, are successively injected into the combustion chambers of the engine at successive timed intervals, one charge being injected into the combustion chambers of each cylinder during each four stroke cycle of the piston operatively mounted in the cylinder.

The compression ignition internal combustion engine 10, includes in combination with other usual parts of a high speed internal combustion engine, a crank case 11, a cylinder block 12, and cylinder heads 13 and 13'.

The cylinder block 12 includes therein walls forming the cylinders, one of which is illustrated in detail in the drawings and is indicated at 14, and the cylinders 14 as illustrated are preferably in the form of externally shouldered sleeves each of which extends through and is seal seated in registering bores formed respectively in the normally upper cylinder block wall 15 and the normally lower cylinder block wall 16.

The cylinder heads 13 and 13', the cylinder block 12, the crank case 11, and the lower half 17 of each main bearing block 18 are preferably separable, and are preferably unitarily secured together by the eccentric shouldered through bolt means set forth in the prior application of Charles Balough, for Engine structures, filed November 22, 1930, Serial No. 497,589, which has matured in U. S. Patent No. 1,972,752, dated September 4, 1934, the lower ends of such through bolts and the nuts therefor being shown at 19 in the drawings.

In the bore 20 of each of the sleeve cylinders 14, a piston 21 provided with piston rings 22 is operatively mounted in a usual manner for high speed engines for reciprocation in the cylinder bore.

A crank shaft 23 is operatively mounted in a usual manner for high speed engines in the crank case in the main bearing blocks 18, and the crank shaft 23 includes, opposite each piston 21, crank arms 24 between the outer ends of which extends a crank pin 25, and each piston 21 has operatively mounted therein in a usual manner for high speed engines a wrist pin 26, and a connecting rod 27 operatively connects each crank pin 25 with each wrist pin 26.

It is to be particularly noted that the crank shaft 23, the connecting rods 27, the wrist pins 26, and the pistons 21 are not only operatively associated with each other as aforesaid in a usual manner for high speed engines, but are each of the size, proportion, and minimum weight, characteristic of such parts for high speed engines.

Each cylinder head 13 and 13', includes a normally lower wall 28, each of which is provided for each cylinder covered thereby with a preferably flat normally lower surface 29 extending across the upper end of the bore of the particular cylinder.

A usual gasket 30 is interposed in the usual manner between the normally lower wall 28 of each of the cylinder heads 13 and 13', and the normally upper wall 15 of the cylinder block 12, and similarly a usual gasket 31 is interposed in the usual manner between the normally lower wall 16 of the cylinder block 12, and the normally upper wall 32 of the crank case 11.

As illustrated the engine 10 is a valve-in-head engine, and accordingly each normally lower wall 28 of the cylinder heads 13 and 13' has formed therein, above the normally upper end of the bore of each cylinder covered thereby, an air intake valve seat orifice 33 and an exhaust valve seat orifice 34, and each of the valve seat orifices has a valve seat formed therein.

A valve 35 is operatively associated with each valve seat orifice 33, and a valve 35' is operatively associated with each valve seat orifice 34, and each of the valves includes a valve head 36 fitting in its respective seat, and a valve stem 37 extending upwardly from the head.

The cylinder heads 13 and 13' have mounted therein valve stem guide tubes 38, one for each valve stem 37, and each valve head 36 is normally maintained in its seat by usual means such as a set of compression springs 39, one end of which reacts against a spring seat 40 formed about each valve stem guide tube 38 in the cylinder head 13, and the other end of which reacts against a flanged washer 41 secured in a usual manner at the upper end of the particular valve stem 37.

A rocker arm cluster indicated generally at 42 is operatively mounted above each cylinder on rocker arm shafts 43 which are mounted on the tops of the cylinder heads 13 and 13', each rocker arm cluster including a rocker member 44 for the air intake valve for the particular cylinder, and a similar rocker member, not shown, for the exhaust valve for the particular cylinder, and each of the rocker members includes a valve stem actuating arm 45 extending from one side of the rocker arm shaft 43 above and in sliding abutment with the upper end of its particular valve stem, and likewise each rocker member includes a push rod actuated arm 46 extending from the opposite side of the rocker arm shafts 43.

A cam shaft 47 is operatively mounted in the crank case 11 at one side of the crank shaft 23, and the cam shaft is driven in a usual manner by the crank shaft as by means of gearing located within the gear housing 48 provided at one end of the crank case.

A cam 49 is provided on the cam shaft 47 for each valve, and a push rod indicated generally by 50 is operatively mounted between each cam 49 and one of the push rod actuated arms 46, each push rod being slidably mounted in push rod guide bearing means indicated generally by 51 and located in the crank case 11, and each push rod extends through sealing and lubricant return tube means indicated generally by 51' and located in the crank case 11, in the cylinder block 12, and in one of the cylinder heads 13 or 13', and the lower end of each push rod 50 abuts against the cam surface of its cam 49, and the upper end of each push rod 50 is provided with a ball and socket connection 52 with its push rod actuated arm 46.

Each air intake valve seat orifice 33 communicatingly connects with one end of an air intake port or passageway 53, the intake ports 53 being formed in the walls of the cylinder heads 13 and 13', and the intake ports of each cylinder head connecting at their outer ends with an intake manifold 54, and each intake manifold 54 communicatingly connecting as by means of an elbow 55 preferably with an air cleaner 56.

Each exhaust valve seat orifice 34 communicatingly connects with one end of an exhaust port or passageway 57, the exhaust ports 57 being formed in the walls of the cylinder heads 13 and 13' and the exhaust ports of each cylinder head terminating at their outer ends in a connector flange 58 whereby the exhaust ports may be communicatingly connected with an exhaust manifold.

Cooling means indicated generally by 59 are provided for the engine 10, and include in general a water pump 60 operatively connected in a usual manner with the crank shaft 23 as by means of gearing contained in the gear housing 48, the pump 60 delivering water into communicating water jacket chambers formed in the crank case, in the cylinder block, and in the cylinder heads, and the water jackets of each cylinder head being provided with a cooling water outlet pipe 61 which may be connected in the usual manner with a radiator, not shown, and the radiator being in turn connected in a usual manner with the intake of the pump 60.

In the engine 10, a chamber $C_V$ is formed within the bore 20 of each cylinder 14 and between a normally top or end flat circular face 62 of the piston 21 operating within the particular bore 20 and the opposite flat circular normally lower inner surface or face 29 of the normally lower cylinder head wall 28 covering the particular bore 20.

Each of the chambers $C_V$ by reason of the reciprocation of the piston forming one wall of the same may be termed a varying volume chamber, and in the engine 10, at top dead center, that is when the end face 62 of each piston 21 has reached its position of maximum travel away from the crank shaft 23, there is only mechanical clearance between the end face 62 of the piston and the opposite flat cylinder head inner face 29.

Walls of the engine form constant volume chambers, one for each cylinder. Each constant volume chamber $C_c$ is located closely adjacent its cylinder, and between each constant volume chamber $C_c$ and its cylinder, walls of the engine form a passageway P communicatingly connecting at one end with the particular constant volume chamber $C_c$ and at the other end with the cylinder bore of the adjacent varying volume chamber $C_V$.

Each constant volume chamber $C_c$ is formed with a curved inner surface 70 which is symmetrical about an axis extending through the center 71 of the constant volume chamber and at right angles to the plane passing through the center 71 of the constant volume chamber and the axial direction or line of movement 72 of the piston 21 in the adjacent cylinder.

As illustrated, the curved inner face 70 of each constant volume $C_c$ is preferably spherical.

Each passageway P connecting a particular constant volume chamber $C_c$ with the adjacent varying volume chamber $C_V$ is provided with an inner face 73 which is laterally co-extensive with the preferably flat inner cylinder head face 29 of the adjacent varying volume chamber $C_V$, and each co-extensive passageway face 73 is tangential with the curved inner surface 70 of the constant volume chamber $C_c$ connected with the adjacent varying volume chamber $C_V$ by the particular passageway P.

The width of each passageway P is preferably as illustrated somewhat less than the diameter of the preferred spherical inner surface 70 for each constant volume chamber $C_c$, and the minimum height $h$ of each passageway P is preferably somewhat less than the radius of the preferred spherical inner surface 70.

As illustrated each constant volume chamber $C_c$ is formed in a socket 74 provided in the upper end wall 15 of the cylinder block. The bottom surface of each socket 74 is hemispherical and the top surface of each socket 74 is cylindric and tangential with the bottom hemispherical surface.

Preferably a removable liner shell 75 is located in the bottom of each socket 74, each liner shell 75 being preferably externally and internally hemispherical, and the internal hemispherical surface of each liner shell 75 forming a portion of the spherical inner surface 70 of the constant volume chamber $C_c$ formed in part by the particular liner shell 75.

In the upper cylindric end of each socket 74, a preferably removable member 76 is located, and as illustrated in said U. S. Patent No. 1,960,093, each member 76 is externally cylindric and its upper end extends beyond the normally top wall 15 of the cylinder block and into a cylindric recess 77 formed in the adjacent cylinder head lower wall 28.

In the normally lower face of each member 76 is formed a cavity 78 which includes the normally upper portions of the spherical inner surface 70 of the particular constant volume chamber $C_c$ formed in part by the particular member 76, and each cavity 78 also includes end portions 79 of the passageway P communicatingly connecting the particular constant volume chamber $C_c$ with the adjacent varying volume chamber $C_v$.

The remaining portions of each passageway P are formed by an extension of the inner face 29 of the adjacent and connected varying volume chamber $C_v$, and by the side and bottom faces of a notch 80 formed in the upper end of the cylinder sleeve 14 of the particular chamber $C_v$ and by the side and bottom faces of a notch 81 formed in the wall 15 of the cylinder block between the cylinder sleeve notch 80 and the adjacent socket 74.

The air intake valve means heretofore described in general comprise means operated in a usual manner for introducing preferably atmospheric air including gaseous oxygen, or in other words a combustion supporting medium, into each varying volume chamber $C_v$ on the air intake stroke of the piston thereof; and the exhaust valve means heretofore described in general, provide means for exhausting each varying volume chamber $C_v$ during the exhaust stroke of the piston thereof.

Means are also provided for injecting the preferably liquid hydrocarbon fuel into each constant volume chamber $C_c$ preferably during the compression stroke of the associated piston, and as illustrated the fuel injecting means includes pintle nozzles 82, one for each constant volume chamber $C_c$, and each of which is operatively mounted in the cylinder block 12, and the discharge end 83 of each of which extends into and terminates in the constant volume chamber $C_c$, with which the particular nozzle is associated.

Each nozzle 82 is communicatingly connected in a usual manner by a tube 84 with one of the discharge outlets 85 of a fuel supply and distributing pump 86 which is driven by a shaft 87 operatively connected with the gearing contained in the gear housing 48. The pump 86 includes timed means injecting a charge of fuel during the proper interval through each of the tubes 84 and the nozzle 82 served thereby into the particular constant volume chamber $C_c$ with which the particular nozzle 82 is associated.

The pump 86 includes governing means which may be contained within casing portions 86' and which are controlled by a control arm 88 which is in effect the throttle for the engine; and the pump 86 is connected by a main fuel supply tube 89 in a usual manner with a source of the desired liquid fuel.

Each nozzle 82 is of usual construction, and is adapted to introduce into the constant volume chamber $C_c$ with which it is associated an atomized conical spray 90 of fuel particles which is directed towards the passageway P connecting with the particular chamber $C_c$.

The longitudinal axis 91 of each conical spray 90 preferably passes through the center 71 of the preferably spherical constant volume chamber $C_c$ served thereby, and according to the improvements set forth in my said U. S. Patent No. 1,960,093, now U. S. Reissue Patent No. 19,742, the apex angle 92 of each conical spray should be substantially no greater than 10 degrees and substantially no less than 6 degrees; and the best results are attained when the apex angle 92 of each conical spray 90 is 8 degrees.

Also according to the improvements set forth in my said U. S. Patent No. 1,960,093, now U. S. Reissue Patent No. 19,742, the longitudinal axis 91 of each conical fuel spray 90 is directed as aforesaid preferably through the center 71 of the constant volume chamber $C_c$ served thereby, and towards the passageway P connecting the particular constant volume chamber $C_c$ with the adjacent varying volume chamber $C_v$; and the axis 91 is located between planes 93 and 93' passing through the center 71 of the spherical conical volume chamber $C_c$ served by the particular spray, the plane 93 being parallel with the inner preferably flat cylindric head face 29 of the adjacent varying volume chamber $C_v$, and the plane 93' extending through the center of the particular spherical constant volume chamber $C_c$ and towards the associated flat inner cylinder head face 29 and at an angle of 45 degrees with the plane 93 and thus with the plane of the particular flat inner cylinder head face 29; and the best results are attained when the angle 94 of the longitudinal axis 91 of each conical spray with respect to the plane 93 and thus with respect to the plane of the associated flat inner cylinder head face 29 is 16 degrees.

Each plane 93 may be described in other words as extending through the center 71 of its constant volume chamber $C_c$ and at right angles with respect to the axial direction or line of movement 72 of the associated piston.

As aforesaid mechanical clearance only is preferably provided between each flat piston end face 62 and the opposite flat inner cylinder head face 29 at the top dead center position of the piston, and the total volume of each constant volume chamber $C_c$ and the associated passageway P, which constitute the clearance volume of the particular cylinder, is small relative to the maximum volume of the associated varying volume chamber $C_v$, so that the compression ratio of the engine may be high, for example 15.8 to 1.

It is also preferred as aforesaid that the length of each passageway P be as short as possible, and as illustrated the length of each passageway P is as short as the particular construction and arrangement of the engine 10 will permit.

In the illustrated engine 10, for starting purposes, a usual glow tube 95 is provided in a usual manner for each constant volume chamber Cc.

The engine 10 furthermore includes a lubricant reservoir or oil pan 100 for the lower opening 101 of the crank case 11, and a lubricant or oil pump 102 is located within the compartment 103 of the reservoir or oil pan 100; and the pump 102 includes a housing 102' in which gear pump mechanism, not shown, is operatively mounted, and a drive shaft 104 extending upwardly through a bore 105 formed preferably in a central crank case transverse wall 106.

At the upper end of the pump drive shaft 104 a spiral pinion or gear 107 is secured and meshes with a spiral gear 108 preferably formed on the central portion of the cam shaft 47, preferably between longitudinally spaced central cam shaft journal rings 109a and 109b provided on the cam shaft 47 and which are journalled in opposite ends of a bushing or bearing sleeve 110 which fits in a suitable horizontally and longitudinally extending bore formed in walls of the crank case.

The pump 102 furthermore includes an inlet at the lower end 111 of its housing 102', and one or more outlets at the inner side 112 of its housing 102', one of the outlets being communicatingly connected with one end of a lubricant or oil delivery tube 113, the other end of which communicatingly connects with the lower end of a lubricant main uptake bore 114 which is formed in a central rib flange portion 115 of the crank case transverse wall 106.

The upper end of the uptake bore 114 communicates with a longitudinally extending lubricant main distributing bore 116 formed as illustrated in the crank case 11 at the side thereof opposite the cam shaft 47.

Lateral lubricant distributing bores, not shown, extend from the main distributing bore 116 to the several main bearings of the crank shaft 23 in a usual manner; and a lateral distributing bore 117 is formed in the transverse central wall 106 of the crank case, and one end of the bore 117 communicates with the main distributing bore 116 and the other end of the lateral distributing bore 117 communicates through an opening 118 in the central cam shaft bearing bushing or sleeve 110 with a cam shaft drive gear lubricating chamber 119 which is formed by the above described arrangement of the longitudinally spaced cam shaft journal rings 109a and 109b being journalled in opposite ends of the sleeve 110.

A metering orificed plug 120 is preferably provided at the end of the bore 117 adjacent the sleeve opening 118, so that the engine parts lubricated beyond the metering orificed plug 120 will receive definite and proper amounts of lubricant.

The bushing or sleeve 110 has formed therein an upper opening 121 which communicates with a sub-reservoir chamber 122 formed in the crank case central wall 106; and the sub-reservoir chamber 122 communicates with further passageways of the lubrication system of the engine as is more fully set forth in my said application, Serial No. 678,689.

The sleeve 110 has also formed therein a front side opening 180, through which the gear 107 extends for meshing with the gear 108.

In the foregoing, the engine 10 is described as including the improvements relating to combustion chambers particularly set forth and claimed in my said U. S. Patent No. 1,960,093, now U. S. Reissue Patent No. 19,742, and also generally as including the improvements in valve apparatus particularly set forth and claimed in my said prior application, Serial No. 678,689, and also generally as including the improvements in cooling apparatus set forth in my said prior application, Serial No. 679,175, and also generally, in connection with the cam shaft bearings and drive connection for the lubricating pump, as including the improvements in shaft gearing and bearings particularly set forth and claimed in the application for U. S. Letters Patent of Guy E. Hinkle, Serial No. 689,865, filed September 18, 1933.

With all of the foregoing, the present improvements are preferably combined and for the purposes of the present improvements the fuel supply and distributing pump 86, which as illustrated is of usual construction and arrangement, and is a Bosch fuel injection pump, made by Robert Bosch, A. G., Stuttgart, Germany, such as described in the Baur and Lempp U. S. Patent No. 1,928,476, dated September 26, 1933, and is supported on the crank case 11 by means of a novel combined supporting, closure, and passageway and chamber forming bracket 200, which is secured to the crank case as by means of cap screws 201, the shanks of which extend through normally horizontal bores formed in side walls of the bracket 200, and the threaded ends of which are screwed into internally threaded sockets with which side walls of the crank case or provided.

The fuel pump 86 includes a casing 202 having a normally bottom wall 203 which is supported upon a normally upper wall 204 of the bracket 200, preferably with a gasket 205, interposed between the fuel pump casing bottom wall 203 and the bracket upper wall 204, and the fuel pump 86 is secured to the bracket 202 as by means of cap screws 206, the shanks of which extend through suitable bores provided in the bracket wall 204 and the inner threaded ends of which screw into internally threaded sockets formed in the fuel pump casing bottom wall 203.

Walls of the crank case 11 form an outwardly opening pocket 207 and walls of the bracket 200 form an inwardly opening pocket 208 the inner opening of which registers with the outer opening of the crank case pocket 207, and forms a reservoir indicated generally by 209, there being a gasket 210 preferably interposed between the bracket 200 and the crank case 11 about the registering openings of the bracket pocket 208 and the crank case pocket 207.

Central portions of the sleeve 110 and of the cam shaft 47 with the spiral gear 108 thereon, and the spiral gear 107 and the upper end portions of the pump drive shaft 104 on which the spiral gear 107 is secured, are all located within the reservoir 209, and accordingly lubricant introduced into the lubricating chamber 119 of the sleeve 110 passes out through the front side opening 180 thereof and fills the reservoir 209, under normal operation of the engine 10.

The fuel pump 86 includes a cam shaft 211 which is operatively mounted in a normally lower cam shaft chamber 212 of the pump casing 202, and the fuel pump cam shaft 211 has formed therein a plurality of cams 213 each of which actuates one of the plunger pistons of the pump (not shown).

Walls of the bracket 200 have formed therein a lubricant delivery passageway 214, the lower end of which opens into the upper outer corner of the bracket pocket 208 forming in part as aforesaid the reservoir 209; and the upper end of the bracket lubricant delivery passageway 214 communicatingly connects through a suitable opening formed in the gasket 205 with the lower end of an uptake passageway 215 formed in the bottom wall 203 of the pump casing 202, and the upper end of the uptake passageway 215 opens into the cam shaft lubricating chamber 212 of the fuel pump casing 202, within which as aforesaid the fuel pump cam shaft 211 is operatively mounted.

The bottom wall 203 of the fuel pump casing 202 has also formed therein an enlarged downtake opening 216, the upper end of which communicates with the chamber 212 and the lower end communicates with one upper end 217—1 of a U passageway 217 formed by certain of the walls of the bracket 200.

The other upper end 217—2 of the U passageway 217 communicates with a spill chamber 218 formed by certain of the walls of the bracket 200, and preferably having an upper opening at 219 which is provided with a removable closure 220.

The upper end 217—2 of the bracket U passageway 217 is preferably provided with a counterbored seat 221 which preferably seats the lower end of a fuel pump crank case chamber lubricant level determining tube 222 which is of such length that the elevation of the upper end 223 thereof is at such level as to maintain the lubricant introduced into the cam shaft chamber 212 of the fuel pump casing 202 at the same level indicated by the dot-dash line 224, and such level 224 being that determined by experience as the necessary level to maintain lubricant in the crank case chamber 212 of the fuel pump casing 202 so as to attain satisfactory operation of the fuel pump as aforesaid.

Walls of the bracket 200 are provided at opposite sides of the U passageway 217 and the delivery passageway 214 with angled discharge passageways 225a and 225b, the upper ends 225a—1 and 225b—1 of which respectively communicate with lower portions of the spill chamber 218 and the lower ends 225a—2 and 225b—2 of which communicate through suitable openings formed in the gasket 210 respectively with the outer ends of passageways 226a and 226b which are formed in side walls of the crank case respectively beyond and at opposite sides of the cam shaft bearings 109a and 109b, the inner ends of the passageways 226a and 226b communicating with the interior reservoir compartment 103 of the crank case as shown in Figs. 4 and 5.

I claim:

1. In an internal combustion engine and the like, walls forming two reservoirs, a lubricating chamber, a delivery passageway communicating between one of the reservoirs and the interior of the lubricating chamber, and a discharge passageway having one end opening into the other reservoir, and passageway means providing a communication between the lubricating chamber and the other end opening of the discharge passageway and operative to maintain lubricant in the lubricating chamber at a predetermined level.

2. In an internal combustion engine and the like, walls forming two reservoirs, a lubricating chamber, a delivery passageway communicating between one of the reservoirs and the interior of the lubricating chamber, and a discharge passageway having one end opening into the other reservoir, and U passageway means providing a communication between the lubricating chamber and the other end opening of the discharge passageway and operative to maintain lubricant in the lubricating chamber at a predetermined level.

3. In an internal combustion engine and the like, walls forming two reservoirs, a lubricating chamber, a delivery passageway communicating between one of the reservoirs and the interior of the lubricating chamber, and a discharge passageway having one end opening into the other reservoir, and passageway means providing a communication between the lubricating chamber and the other end opening of the discharge passageway and operative to maintain lubricant in the lubricating chamber at a predetermined level, and means for introducing lubricant into the reservoir communicating with the delivery passageway.

4. In an internal combustion engine and the like, walls forming two reservoirs, a lubricating chamber, a delivery passageway communicating between one of the reservoirs and the interior of the lubricating chamber, and a discharge passageway having one end opening into the other reservoir, and U passageway means providing a communication between the lubricating chamber and the other end opening of the discharge passageway and operative to maintain lubricant in the lubricating chamber at a predetermined level, and means for introducing lubricant into the reservoir communicating with the delivery passageway.

5. In an internal combustion engine and the like, walls forming two reservoirs, a lubricating chamber, a delivery passageway communicating between one of the reservoirs and the interior of the lubricating chamber, and a discharge passageway having one end opening into the other reservoir, and passageway means providing a communication between the lubricating chamber and the other end opening of the discharge passageway and operative to maintain lubricant in the lubricating chamber at a predetermined level, and means for introducing lubricant under pressure into the reservoir communicating with the delivery passageway.

6. In an internal combustion engine and the like, walls forming two reservoirs, a lubricating chamber, a delivery passageway communicating between one of the reservoirs and the interior of the lubricating chamber, and a discharge passageway having one end opening into the other reservoir, and U passageway means providing a communication between the lubricating chamber and the other end opening of the discharge passageway and operative to maintain lubricant in the lubricating chamber at a predetermined level, and means for introducing lubricant under pressure into the reservoir communicating with the delivery passageway.

7. In an internal combustion engine and the like, walls forming two reservoirs, a lubricating chamber, a delivery passageway communicating between one of the reservoirs and the interior of the lubricating chamber, and a discharge passageway having one end opening into the other reservoir, and passageway means providing a communication between the lubricating chamber and the other end opening of the discharge passageway and operative to maintain lubricant in the lubricating chamber at a predetermined level, and means for delivering lubricant from the reservoir communicating with the discharge passageway to the reservoir communicating with the delivery passageway.

8. In an internal combustion engine and the like, walls forming two reservoirs, a lubricating chamber, a delivery passageway communicating between one of the reservoirs and the interior of the lubricating chamber, and a discharge passageway having one end opening into the other reservoir, and U passageway means providing a communication between the lubricating chamber and the other end opening of the discharge passageway and operative to maintain lubricant in the lubricating chamber at a predetermined level, and means for delivering lubricant from the reservoir communicating with the discharge passageway to the reservoir communicating with the delivery passageway.

9. In an internal combustion engine and the like, walls forming two reservoirs, a lubricating chamber, a delivery passageway communicating between one of the reservoirs and the interior of the lubricating chamber, and a discharge passageway having one end opening into the other reservoir, and passageway means providing a communication between the lubricating chamber and the other end opening of the discharge passageway and operative to maintain lubricant in the lubricating chamber at a predetermined level, and means for delivering lubricant under pressure from the reservoir communicating with the discharge passageway to the reservoir communicating with the delivery passageway.

10. In an internal combustion engine and the like, walls forming two reservoirs, a lubricating chamber, a delivery passageway communicating between one of the reservoirs and the interior of the lubricating chamber, and a discharge passageway having one end opening into the other reservoir, and U passageway means providing a communication between the lubricating chamber and the other end opening of the discharge passageway and operative to maintain lubricant in the lubricating chamber at a predetermined level, and means for delivering lubricant under pressure from the reservoir communicating with the discharge passageway to the reservoir communicating with the delivery passageway.

OTIS D. TREIBER.